United States Patent [19]

Iijima

[11] Patent Number: 4,688,808
[45] Date of Patent: Aug. 25, 1987

[54] COMPOSITE SLIDING STRUCTURE FOR PISTON BODY

[75] Inventor: Yoshio Iijima, Nagoya, Japan

[73] Assignee: Daido Metal Company Ltd., Nagoya, Japan

[21] Appl. No.: 828,594

[22] Filed: Feb. 11, 1986

Related U.S. Application Data

[63] Continuation of Ser. No. 642,894, Aug. 21, 1984, abandoned.

[30] Foreign Application Priority Data

Oct. 21, 1983 [JP] Japan ................. 58-197100

[51] Int. Cl.$^4$ .................. F16J 1/01; F16J 1/02
[52] U.S. Cl. .................. 277/223; 277/216; 92/223
[58] Field of Search .............. 277/212 C, 216, 223, 277/224; 308/DIG. 8; 92/222-224

[56] References Cited

U.S. PATENT DOCUMENTS

| 2,162,830 | 6/1939 | Summers | 92/223 |
| 2,221,988 | 11/1940 | Morton | 277/223 |
| 2,297,113 | 9/1942 | Phillips | 277/223 |
| 2,472,540 | 6/1949 | Meador | 277/223 |
| 2,817,562 | 12/1957 | Fleming et al. | 92/223 X |
| 2,908,537 | 10/1959 | Kipp | 277/223 |
| 2,995,462 | 8/1961 | Mitchell et al. | 308/DIG. 8 |
| 3,811,692 | 5/1974 | Brenneke | 277/223 |
| 4,358,881 | 11/1982 | Mahrus et al. | 92/223 X |

FOREIGN PATENT DOCUMENTS

| J 2520 | 7/1956 | Fed. Rep. of Germany | 92/223 |
| 2452 | 3/1956 | Japan . | |
| 16950 | 1/1964 | Japan . | |
| 57-149657 | 9/1982 | Japan | 92/223 |
| 507084 | 6/1939 | United Kingdom | 92/223 |
| 756950 | 8/1954 | United Kingdom . | |
| 912793 | 7/1961 | United Kingdom . | |

Primary Examiner—Robert S. Ward
Attorney, Agent, or Firm—Browdy and Neimark

[57] ABSTRACT

A composite sliding structure which can be applied to automotive shock absorbers or sliding portions of hydraulic apparatus or pneumatic apparatus and comprises a deformable member in the form of piston, bush, or spherical seat, and a sliding member acting as a self-lubricating sliding member, which is partially deformed plastically and united with the deformable member into one body, thereby to prevent noise, vibration, an oil or gas leak.

4 Claims, 22 Drawing Figures

COMPOSITE SLIDING STRUCTURE FOR PISTON BODY

This application is a continuation of application Ser. No. 642,894, filed Aug. 21, 1984, now abandoned.

BACKGROUND OF THE INVENTION

This invention relates to a composite sliding structure which can be applied to automotive shock absorbers or sliding portions of hydraulic apparatus or pneumatic apparatus in other industrial fields.

In conventional hydraulic apparatus, such as, automotive shock absorbers, piston rings, which are loosely received in the outer peripheral grooves, tend to jolt in the outer peripheral grooves to cause noise, vibration, wear and oil leaks.

Furthermore, since guide bushes slidable in the longitudinal direction of the rods of automotive shock absorbers, and other parts for other industrial machines, such as floating bushes for turbines and general idlers, spherical bearings, end bushes and double bushes, are only press-fitted and/or inserted into their housings, the outside and inside diameters of these bushes lack uniformity and make local contact with the rods in the vertical or rotatory motion, thus causing much noise, vibration, wear and oil leakage, and resulting in short life which necessitates frequent renewal. On the other hand, plastics or ceramics alone are too weak or brittle to be used satisfactorily in high speed rotating or rocking members.

SUMMARY OF THE INVENTION

Accordingly, it is an object of this invention to overcome such defects of the prior art as described above.

It is another object of this invention to provide a composite sliding structure excellent in durability which in operation, (1) prevents noise and vibration, (2) prevents oil leakage or gas leakage so as to avoid reduction of pressure, (3) reduces wear of sliding members and (4) makes up for the brittleness and the low impact resistance of sliding members.

To this end the invention provides a composite sliding structure composed of a deformable member and a sliding member united with each other, at least one of these members being plastically deformed.

These and other objects, features, advantages and uses will become more apparent as the description proceeds, when considered with the accompanying drawings.

DESCRIPTION OF THE DRAWINGS

FIGS. 1B to 9A are cross sectional views of the first to ninth embodiments of composite sliding structures in accordance with this invention;

DESCRIPTION OF THE PREFERRED EMBODIMENTS

Figure 1A:
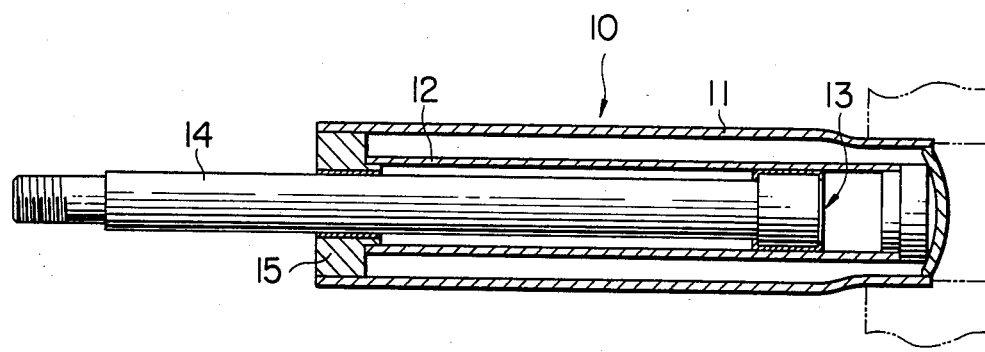
FIG. 1A is a longitudinal section view of an automotive shock absorber incorporating a composite sliding structure of the invention.

FIG. 1A shows an automotive shock absorber 10 incorporating the first embodiment of the composite sliding structure 1a in accordance with this invention. This shock absorber includes an external cylinder 11, a cylinder 12, a piston 13, a rod 14 to which the piston 13 is secured, and a rod guide 15 which is fixed to the external cylinder 11 and the cylinder 12. The piston 13 is composed of the first embodiment of the composite sliding structure in accordance with this invention.

Figure 1B:
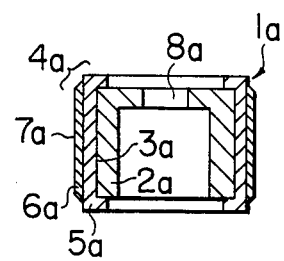

Referring to FIG. 1B, the composite sliding structure 1a includes a piston member 2a of ferrous metal, or more particularly sintered ferrous material, which is used as a deformable member and a self-lubricating sliding member 4a used as a sliding member which has a U-shaped cross section and is plastically deformed so as to surround the entire periphery 3a of the piston member 2a by coining or caulking. In the piston member 2a is formed a rod receiving bore 8a. The self-lubricating sliding member 4a is a dry bearing of the type disclosed in Japanese Patent Publication Nos. 2452/1956, and 16950/1964, and U.S. Pat. No. 2995462 and British Patent No. 912793, and consists of a steel layer 5a of ferrous metal, and a sliding layer 6a which consists of non-ferrous metal such as porous copper, porous copper alloy, porous bronze, lead (Pb) and lead oxide (PbxOy) and non-metal such as PTFE (polytetrafluoroethylene) and graphite. The sliding layer 6a of the self-lubricating sliding member 4a is excellent in wear resistance, fatigue properties and seizing resistance, and slidably makes contact at the sliding surface 7a with the inner surface of the cylinder 12. As the composite sliding structure is formed in one body, the dimensional accuracy thereof is high and as it slidably makes contact with the inner surface of the cylinder uniformly, it is free from noise and vibration caused by loose fitting such as found in the prior art and it is free also from wear and oil leakage caused by local contact between bushes and rods.

Figure 2:
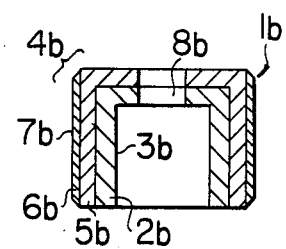

Referring now to FIG. 2 showing the second embodiment of a composite sliding structure in accordance with this invention, the composite sliding structure 1b is the same as the composite sliding structure 1a in FIG. 1B except for the shape of a steel layer 5b.

Figure 3:
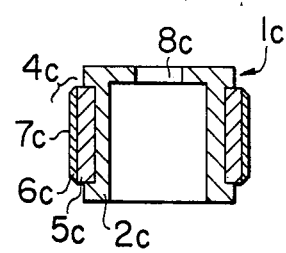

FIG. 3 shows the third embodiment of a composite sliding structure in accordance with this invention. A self-lubricating sliding member 4c of the composite sliding structure 1c is formed in an approximately circular shape, and is rigidly secured to the groove formed on the outer peripheral surface of a piston member 2c, by coining, caulking, die casting, cold working or shrink fit and thus made integral with sliding member 2a. This composite sliding structure 1c offers the same advantage as those of the preceding embodiments shown in FIGS. 1A and 2.

Figure 4:
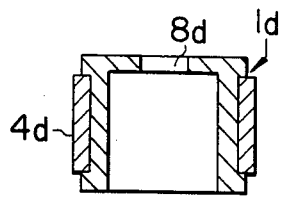

The fourth embodiment of a composite sliding structure in accordance with this invention show in FIG. 4 has a composite sliding member 1d which is different from the composite sliding member 1c in FIG. 3, in that a self-lubricating sliding member 4d is composed of a single member.

Figure 5:
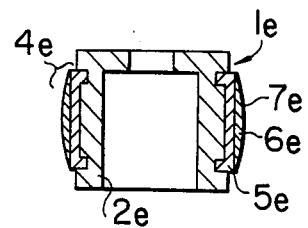

Referring to FIG. 5, which shows the fifth embodiment of a composite sliding structure of this invention, this composite sliding structure 1e is different from the third embodiment in FIG. 3 in that the outer peripheral surface of a self-lubricating sliding member 4e is formed convexly and the upper and lower ends project radially inwardly. This convex sliding member 4e does not cause wear due to local contact even when its trajectory is inclined in relation to the cylinder in which it slides (not shown) and thus produces the effect of low friction. As to the other effects, this embodiment is materially the same as the first and fourth embodiments.

Figure 6:
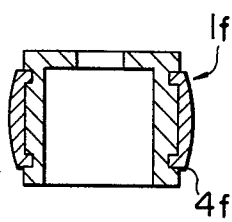

Referring to FIG. 6 showing the sixth embodiment of a composite sliding structure in accordance with this invention, the composite sliding structure 1f is the same as the fifth embodiment in FIG. 5 except that a self-sliding member 4f is composed of a single member.

Figure 7:
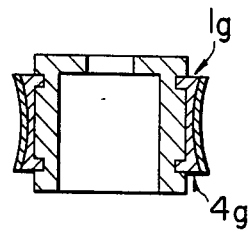

Referring to FIG. 7, there is shown the seventh embodiment of a composite sliding structure 1g in accordance with the invention. The composite sliding structure 1g is the same as the fifth embodiment in FIG. 5, except that the external peripheral surface is formed concavely. The concave self-lubricating sliding member 4g does not suffer wear due to the local contact, even when it is inclined in relation to the cylinder (not shown), and produces the effect of low friction. As to the other effects, this embodiment is materially the same as the first and sixth embodiments.

Figure 8:
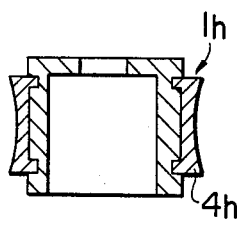

Referring to FIG. 8 which shows an eighth embodiment of a composite sliding structure in accordance with this invention, the composite sliding structure 1h is materially the same as the seventh embodiment in FIG. 7 except that a self-lubricating sliding member 4h is composed of a single member.

Figure 9A:
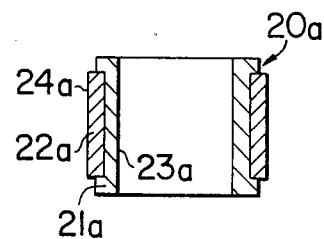

The ninth embodiment of a composite sliding structure in accordance with this invention is shown in FIG. 9A. The composite sliding structure 20a of this embodiment is applied to a floating bush which can be used for turbines and general idlers. This composite sliding structure 20a is composed of a bush 21a and a sliding member 22a. The material of the bush 21a is an oil-impregnated ferrous sintered material which is used as a deformable material, and aluminum die castings, copper sintered material or sintered materials which have a good sliding property. The material of the sliding member 22a is cermet, polyimide or the like which is brittle and heat resistant, and the sliding member 22a is secured to a groove formed on the outer peripheral surface of the bush 21a by coining, caulking, due casting, cold working or shrink fit. Since the bush 21a made of materal having a good sliding property is used as a deformable member, and the sliding member 22a is made of a material which is brittle and heat resistant, the inner peripheral surface 23a and the outer periheral surface 24a of the composite sliding structure 20a can be finished to a high dimensional precision by, for example, burnishing.

Figure 9B:
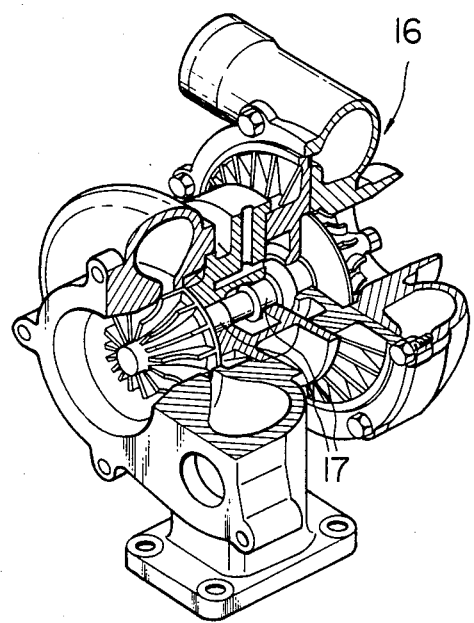
FIGS. 9B and 9C are a perspective view and a cross sectional view, respectively, of a supercharger in which the composite sliding structure shown in FIG. 9A is mounted as a floating bearing.
Figure 9C:
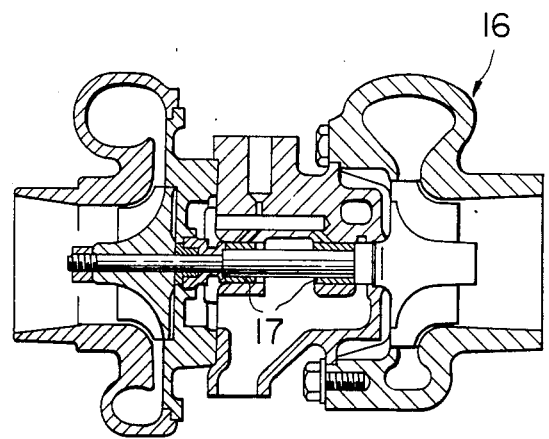

FIGS. 9B and 9C show a supercharger 16 incorporating a composite sliding structure 20a, which is the ninth embodiment of this invention, as a floating bearing 17. Since the inner peripheral surface 23a and the outer peripheral surface 24a of the composite sliding structure 20a are heat resisnant and wear resistant, smooth rotation in the operation of the supercharger 16 is enabled.

Figure 10:
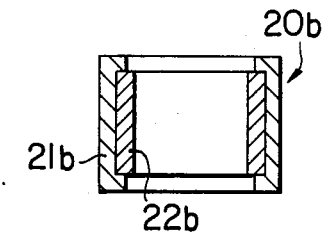
FIGS. 10 to 12 are cross-sectional views of tenth to twelfth embodiments of composite sliding structures in accordance with the present invention.

Referring to FIG. 10 showing the tenth embodiment of a composite sliding structure in accordance with this invention, the composite sliding structure 20b of this embodiment is different from the ninth embodiment in FIG. 9A in that a sliding member 22b is secured to a groove formed on the inner peripheral surface of a bush 21b.

Figure 11:
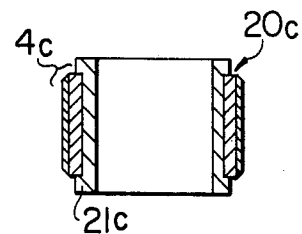

Referring to FIG. 11, the eleventh embodiment of a composite sliding structure in accordance with this invention, designated by reference numeral 20c, is different from the ninth embodiment in FIG. 9A in that a self-lubricating sliding member similar to that shown by 4c in the third embodiment in FIG. 3 is secured to a groove on the outer peripheral surface of a bush 21c.

Figure 12:
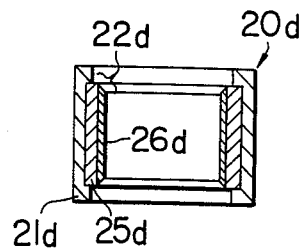

Referring to FIG. 12 showing the twelfth embodiment of a composite sliding structure in accordance with this invention, the composite sliding structure 20d of this embodiment, is different from the tenth embodiment in FIG. 10 in that a sliding member 22d, which is similar to the self-lubricating sliding member 4c in the third embodiment in FIG. 3 both in function and in structure, is secured to a groove on the inner peripheral surface of the composite sliding structure 22d. The sliding member 22d consists of a steel layer 25d and a sliding layer 26d. The sliding member 25d and the sliding layer 26d correspond to the steel layer 5c and the sliding layer 6c, respectively, in FIG. 3. This composite sliding structure 20d has materially the same effects as the composite sliding structures 20a, 20b and 20c which are the ninth, tenth, and eleventh embodiments of this invention, respectively.

Figure 13:
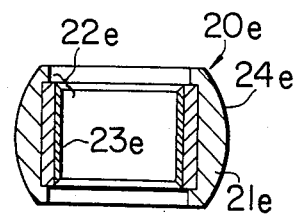
FIGS. 13 and 14 are cross-sectional views of spherical bearings using thirteenth and fourteenth embodiments of this invention.

FIG. 13 shows the thirteenth embodiment of this invention used for a spherical bearing 20e. This spherical bearing 20e includes a spherical seat 21a which is used as a deformable member and a self-lubricating sliding member 22e secured to the inner bore of the spherical seat 21a by plastic deformation. The spherical seat 21a is made of ferrous metal, non-ferrous metal (aluminum or copper) or non-metal (plastic), oil-impregnated sintered material or oil-impregnated injected material. This self-lubricating member 22e is substantially the same as the self-lubricating sliding member 22d in the twelfth embodiment in FIG. 12. As the self-lubricating sliding member 22e and the spherical seat 21e are united into one body, it is possible to finish the partial peripheral surface 24e and the inner surface 23e to a predetermined dimension and in operation, the sliding member may slide with low friction on both surfaces.

Figure 14:
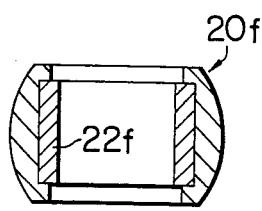

Referring to FIG. 14, which shows the fourteenth embodiment of a composite sliding structure in accordance with this invention, this embodiment is used for a spherical bearing 20f. This spherical bearing 20f is the same as the thirteenth embodiment in FIG. 13 except that a self-lubricating sliding member 22f is composed of a single member.

Figure 15:
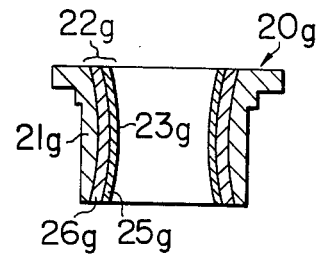
FIGS. 15 and 16 are cross-sectional views of guide bushes using fifteenth and sixteenth embodiments of this invention.

FIG. 15 shows the fifteenth embodiment of a composite sliding structure in accordance with the invention. This composite sliding structure 20g is used for a guide bush slidable in the longitudinal direction of a rod of an automotive shock absorber. This composite sliding structure 20g includes a flanged bush 21g of iron sintered material and a convex self-lubricating sliding member 22g coined to the inner bore of the bush 21g either after or at the same time as press fitting. The inner peripheral surface 23g of the self-lubricating member 22g becomes convex by coining the whole part of the composite sliding structure 20g. The self-lubricating sliding member 22g is in the form of a coiled bush and has a composite structure similar to the self-lubricating sliding member 22d of the twelfth embodiment in FIG. 12. This convex form makes it possible to prevent local contact of the inner surface, noise, vibration, wear and slip-off of a self-lubricating sliding member.

Figure 16:
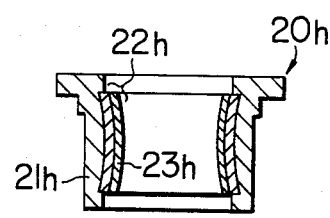

FIG. 16 shows the sixteenth embodiment of a composite sliding structure in accordance with the invention. This composite sliding structure 20h is used for the same purpose as in the fifteenth embodiment in FIG. 15. This embodiment is identical to the fifteenth embodiment in FIG. 15 except that a self-lubricating sliding member 22h is secured to a groove formed on the inner peripheral surface of a flanged bush 21h by coining so as to form a convex inner peripheral surface 23h. As the deformable material of which a flanged bush may be composed, instead of iron sintered material (ferrous metal), either aluminum die castings (non-ferrous metal) or plastic (non-metal), or a powdered pressed composition incorporating both of them can be used.

Figure 17:
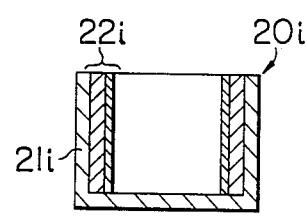
FIG. 17 is a cross-sectional view of an end bush using a seventeenth embodiment of this invention.

FIG. 17 shows the seventeenth embodiment of this invention. This embodiment is used for an end bush 20i, which includes a cup-like bush 21i of ferrous sintered material as a deformable member and a composite self-lubricating sliding member 22i in the form of a coiled bush and wholly coined after pressing into the inner bore of the bush 21i. This end bush 20i can be finished to predetermined inner and outer diameters, and therefore, it can bring about the effect of low friction since it allows for an adequate tightening margin and enhanced dimensional accuracy.

Figure 18:
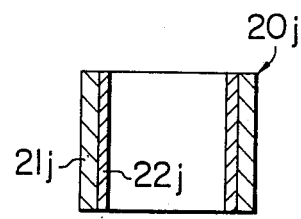
FIGS. 18 and 19 are cross-sectional views of double bushes using eighteenth and nineteenth embodiments of this invention.

FIG. 18 shows the eighteenth embodiment of this invention. This embodiment is used for a double bush 20j, which includes a bush 21j of porous plastic sintered material and a sliding member 22j of brittle and heat resistant material such as ceramic, cermet, polyimide. The bush 21j acts as a deformable member, namely elastic material which absorbs shock and thermal distortion. The sliding member 22j is secured to the inner bore of the bush 21j by coining. This double bush 20j, the material of which is a brittle material (heat-resistant material), has the merit of lightness and is excellent in heat resistance, wear resistance and shock resistance.

Figure 19:
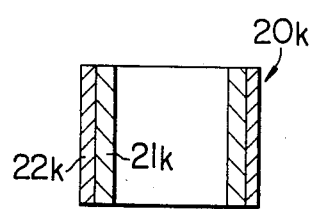

FIG. 19 shows the nineteenth embodiment of the invention. This embodiment is used for a double bush 20k, which is different from the eighteenth embodiment in FIG. 18 in that a sliding member 22 is wholly secured to the outer peripheral part of sintered material 21k by coining at the same time as press fitting.

Incidentally, the inventor of the present application had developed bearing members (registered trademark: DAIDYNE) and multi-layered bearings (registered trademark: DAIDYNE II), prior to this invention. It was confirmed that the same satisfactory effects as mentioned above are produced by using these bearing members (DAIDYNE) or multi-layered bearing (DAIDYNE II) as self-lubricating sliding members in place of the dry bearings mentioned above. This bearing member DAIDYNE is disclosed in Japanese Laid-Open No. 96041/1979, and U.S. Pat. No. 4,312,772, British Pat. No. 2,036,194 and West German Pat. No. 2,857,283 and the multi-layered bearing DAIDYNE II is disclosed in Japanese Laid-Open No. 28016/1983, West German Laid-Open No. 3,229,667, U.S. Pat. application Ser. No. 404,673/1982 and British Patent Application No. 8,223,184/1982.

It goes without saying that deformable materials, non-ferrous materials and non-metals are not limited to the respective materials of the embodiments but other materials, for example, deformable materials other than ferrous sintered material, non-ferrous metal other than copper, copper alloy, bronze, lead, and oxide, and non-metals other than plastic, can be used.

What is claimed is:

1. A composite sliding structure comprising:
   a porous member which can be deformed by pressure forming to form a very dense member; and
   a sliding member provided on one side of the porous member and pressure formed to be integral with said porous member and to have a predetermined wall thickness;
   said porous member comprising a piston made of iron-base sintered material and said sliding member comprising a sliding bearing member.

2. The sliding structure of claim 1 wherein said sliding member is a simple sliding bearing member.

3. The sliding structure of claim 1 wherein said sliding member is a composite sliding member.

4. The sliding structure of claim 1 wherein said structure is substantially annular-shaped.

* * * * *